United States Patent [19]

Baxter et al.

[11] 4,159,048

[45] Jun. 26, 1979

[54] ONE WAY COIL CLUTCH WITH ELECTRIC RELEASE

[75] Inventors: Donald J. Baxter, South Euclid; Robert D. Lowery, Willowick, both of Ohio

[73] Assignee: Marquette Metal Products Co., Cleveland, Ohio

[21] Appl. No.: 802,652

[22] Filed: Jun. 2, 1977

[51] Int. Cl.² .................. F16D 67/06; F16D 41/00
[52] U.S. Cl. ...................... 192/12 BA; 192/41 S; 192/47
[58] Field of Search ............... 192/12 BA, 41 S, 47, 192/81 R

[56] References Cited

U.S. PATENT DOCUMENTS

| 2,951,568 | 9/1960 | Hungerford et al. | 192/12 BA |
|---|---|---|---|
| 3,302,762 | 2/1967 | Conlon | 192/41 S |
| 3,340,975 | 9/1967 | Erickson | 192/81 R |
| 3,425,526 | 2/1969 | Baer | 192/12 BA |
| 3,465,857 | 9/1969 | Baer | 192/36 |
| 3,837,450 | 9/1974 | Malion et al. | 192/12 BA |
| 3,876,184 | 4/1975 | Eudy | 192/12 BA |
| 4,055,935 | 11/1977 | Malion et al. | 192/12 BA |

FOREIGN PATENT DOCUMENTS 386358 1/1933 United Kingdom ................... 192/41 S

*Primary Examiner*—Benjamin W. Wyche
*Attorney, Agent, or Firm*—Arthur Frederick

[57] ABSTRACT

The actuator assembly is a unitary structure comprising a self-braking rotary power unit and a spring clutch mounted on a frame and interconnected so that the spring clutch transmits the rotary driving force of the power unit to a load to thereby effect its movement in one direction, the power unit and spring clutch coacting when the power unit is inoperative to hold the load in a selected position. An electro-magnetic device coacts with the spring clutch to cause the spring to disengage and allow the load to move in a direction opposite of the one direction.

1 Claim, 5 Drawing Figures

ONE WAY COIL CLUTCH WITH ELECTRIC RELEASE

This invention relates to actuators and more specifically to an actuator assembly employing a spring clutch.

BACKGROUND OF THE INVENTION

Actuators for the control of the movement and adjustment of members, such as louvered-type valves installed in the air ducts of large apartment buildings, office buildings, hospitals and the like, must respond quickly on command from a remote location and hold the selected adjusted position. In addition, it is desirable that the actuator be a factory assembled unitary structure and of relatively simple and compact construction.

Accordingly, it is an object of this invention to provide an actuator assembly which is of a factory-assembled unitary structure capable of quick and easy installation.

Another object of the present invention is to provide an actuator assembly which is relatively simple in construction and yet reliable in function.

A further object of this invention is to provide an actuator assembly which responds quickly and accurately to command signals from a point remote from the actuator assembly.

SUMMARY OF THE INVENTION

Accordingly, the present invention contemplates an actuator assembly for effecting movement of a load, as for example, a louvered valve in an air duct, comprising a frame to which is mounted a self-braking rotary power unit and a spring clutch. The spring clutch comprises axially spaced coaxial input and output drums, the input drum being connected to be driven by the rotary power unit and the output drum being connected to the load to effect movement of the latter. A clutch spring engages both the input and output drums to transmit torque from the input drum to the output drum and hence movement of the load in one direction. A sleeve is disposed to surround the coil spring and in engagement with a portion of the clutch spring to control engagement and disengagement of the clutch. A means is provided which is selectively operative to coact with the sleeve to effect disengagement of the spring clutch and allow the output drum to rotate under the force of the load rotating in a direction opposite the torque transmitting direction of rotation.

In one embodiment of the present invention the means is a coil spring connected to a solenoid which, when energized, causes the coil spring to grip the sleeve and rotate the latter and thereby cause the spring clutch to disengage and allow the output drum to rotate under the force of the load.

In another embodiment, the means is an electro-magnetic coil which is disposed to act, when energized, on the sleeve to hold the latter against rotation so that the clutch spring engages the output drum to transmit torque from the input drum to the output drum. Upon de-energization of the coil, the sleeve is released for angular movement to thus disengage the spring and permit rotative movement of the output drum under the force of the load.

BRIEF DESCRIPTION OF THE DRAWINGS

The invention will be more fully understood from the following detail description thereof when considered in connection with the accompanying drawing wherein two embodiments of the invention are illustrated by way of example, and in which.

DESCRIPTION OF PREFERRED EMBODIMENTS

Figure 1:
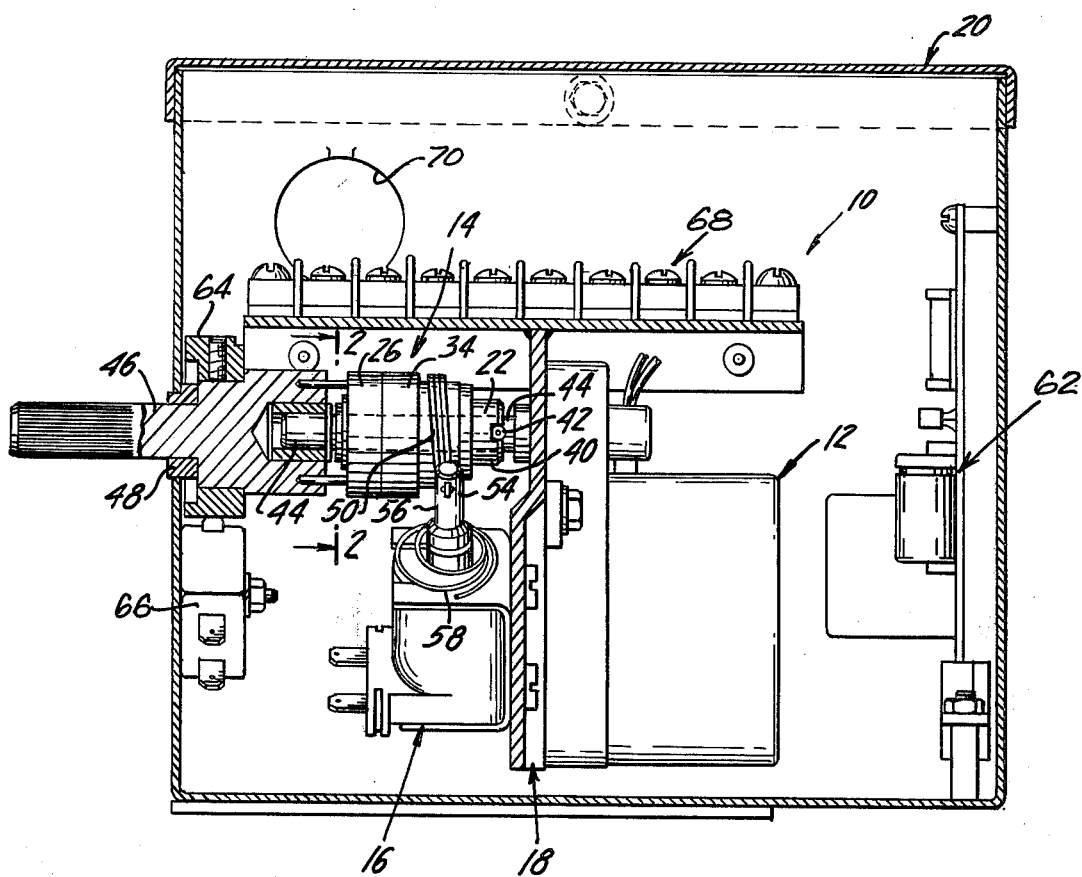
FIG. 1 is a cross-sectional view of the actuator assembly according to a first embodiment of this invention.
Figure 2:
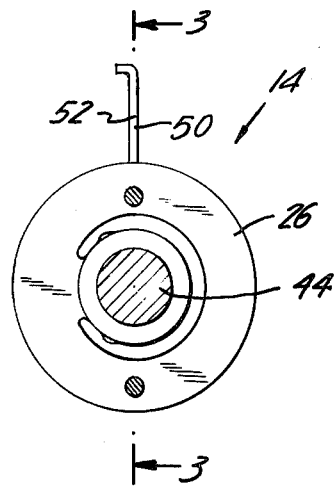
FIG. 2 is a view in cross-section taken along line 2—2 of FIG. 1, somewhat enlarged.
Figure 3:
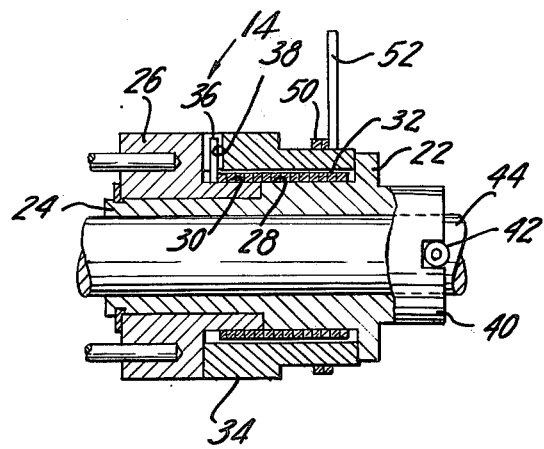
FIG. 3 is a cross-sectional view taken along line 3—3 of FIG. 2.

Now, referring to the drawings and more particularly to FIGS. 1 to 3, the reference number 10 generally designates an actuator assembly according to a first embodiment of this invention. The actuator assembly 10 comprises a self-braking rotary power unit 12, a spring clutch 14 and a solenoid 16 which are mounted on a frame 18. The actuator assembly 10 may be disposed in a box-like housing 20 with the frame 18, as shown, secured to the housing walls.

The self-braking rotary power unit 12 may be, as shown, an electric motor and may be of the type manufactured by Brevel Motors Division of McGraw-Edison Company, Carlstadt, N.J. and designated as part number 715-12132. Also, without departure from the scope and spirit of this invention, rotary power unit 12 may be a hydraulic or pneumatic motor and worm and worm wheel-type speed reducer assembly which inherently provides braking against reverse rotation when stopped by reason of the steep helix angle between the worm and worm wheel of the speed reducer.

As best shown in FIGS. 2 and 3, spring clutch 14 comprises an input drum 22 which may be of tubular construction with a reduced diameter portion 24 on which is journaled an output drum 26. The input drum 22 and output drum 26 each have a clutch surface 28 and 30, respectively, which are coextensive. A clutch spring 32 surrounds and is in interference fit with clutch surfaces 28 and 30 so as to transmit torque from input drum 22 to in drum 26. Surrounding and in close spaced relation to clutch spring 28 is a control sleeve 34. Clutch spring 32 has an offset portion or tang 36 which extends substantially radially into a notch 38 in control sleeve 34. With one end portion of clutch spring 32 connected to control sleeve 34, rotation of the control sleeve relative to clutch spring 32 will cause the coils of clutch spring 32 gripping surface 30 of output drum 26 to expand and release output drum 26 and hence disengage spring clutch 18. In the torque transmitting operative mode, control sleeve 34 rotates with clutch spring 32, input drum 22 and output drum 26.

The input drum 22 of spring clutch 14 is provided with a notched end portion 40 which engages a pin 42 carried by a driveshaft 44 of rotary power unit 12. The driveshaft 44 is axially receivable in input drum 22 and extends therethrough to a point beyond output drum 26. As shown in FIG. 1 the distal end of driveshaft 44 may be journaled in an output shaft 46 which, in turn, is supported for rotation in sleeve bearing 48 disposed in an opening in the wall of housing 20. The output shaft 46 is suitably connected by means (not shown) to a load (not shown) to be moved. The load, such as a louvered valve for an air duct of a heating or cooling system, may be biased by gravity or mechanical means in a direction opposite to the torque transmitting direction of rotation so that when rotary power unit is not operative, the load exerts a force tending to rotate the output drum 26 in that opposite direction. Since the output drum 26 of spring clutch 14 is held against rotation by reason of its direct connection with the self-braking rotary power unit 12, the load is held in the selected position of adjustment when rotary power unit 12 is not operative. To effect disengagement of spring clutch 14, and release of output drum 26 for rotation under the torque foce of the load, a release spring 50 is wrapped around control sleeve 34.

The release spring 50 is a helically wound spring with the "hand" being such that, in the torque transmitting direction of rotation of spring clutch 14, the coils tend to expand so that the release spring overruns the control sleeve as the latter rotates. The release spring has a substantially radially extending tang portion 52 which is of a length sufficient to pass through an opening 54 in the end portion of the movable core 56 of solenoid 16. With tang portion 52 connected to core 56, retraction of the core upon energization of solenoid 16 will exert a force on release spring 50 causing control sleeve 34 to rotate when self-braking rotary power unit 12 is not driving. This rotation of the control sleeve, via tang portion 36 and notch 38, causes the coils of clutch spring 32, adjacent clutch surface 30 of output drum 26, to expand and release the output drum 26 for rotation under the torque force exerted by the load. De-energization of solenoid 16 will allow core 56 to extend under the force of spring 58 and control sleeve 34 again to be free to rotate as the coils adjacent output drum 26 wrap back down upon its clutch surface 30. When the coils of clutch spring 32 again grip output drum 26, the load is held against movement.

Figure 5:
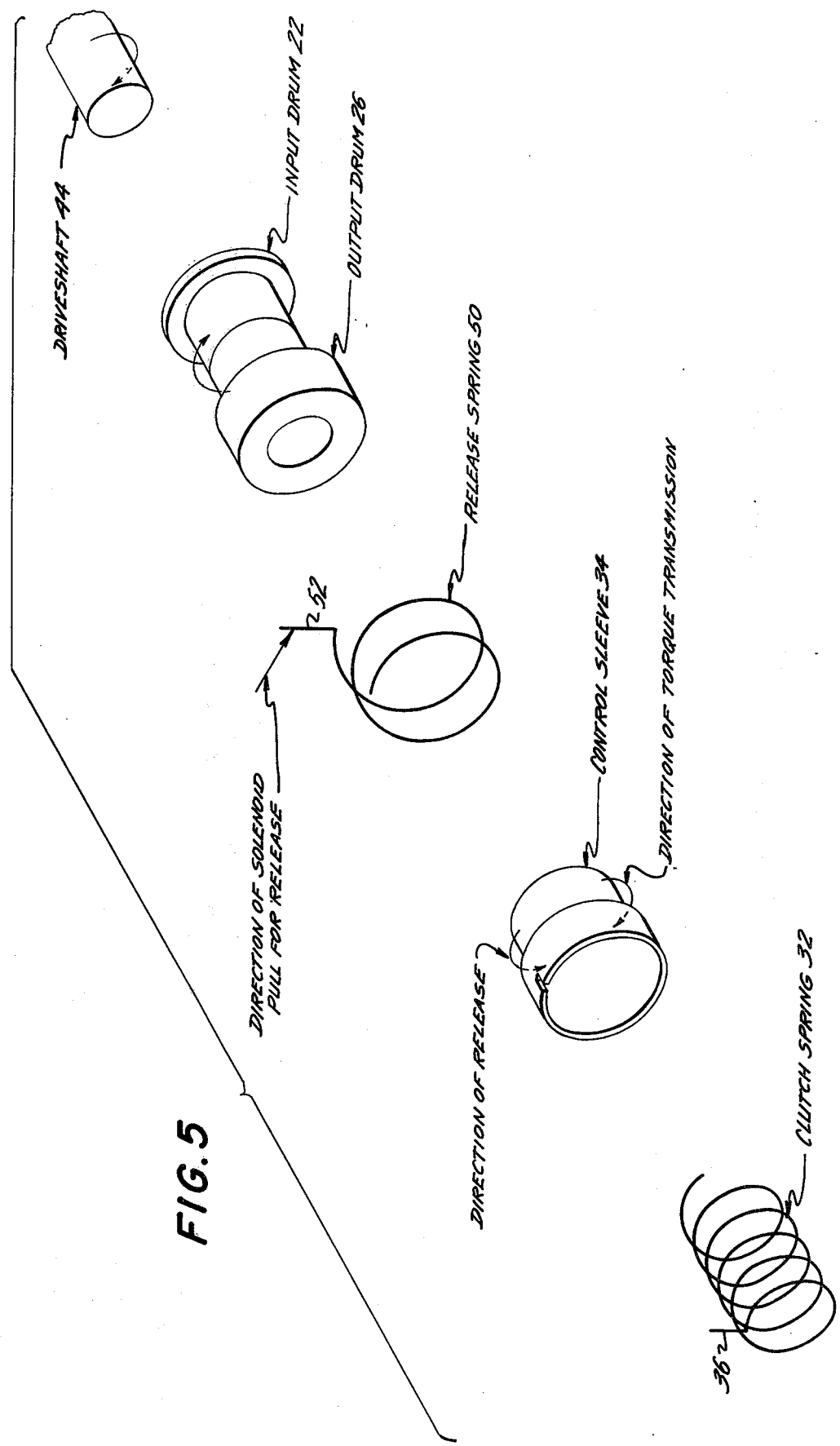
FIG. 5 is a schematic, exploded view in perspective of the spring clutch shown in FIGS. 2 and 3.

To better understand the construction and function of actuator assembly 10, it will be assumed that the direction of rotation of self-braking rotary power unit 12 for moving a load, i.e. louvers, is in clockwise direction as viewed in FIG. 2 and as shown by the arrows in FIG. 5 so that input drum 22 is rotated clockwise. With this direction of torque transmitting rotation, spring 32 has a right-hand helical wind as viewed in FIG. 2 and shown in FIG. 5 so that rotation of input drum 22 wraps-down the coils of spring 32 on output drum 26. Since control sleeve 34 is rotatively carried by spring 32, release spring 50 has a right-hand wind so that its coils tend to expand so as to override the control sleeve when the sleeve is driven by motor 12. When the self-braking rotary power unit 12 ceases to rotate, output drum 26 tends to rotate, as viewed in FIG. 2, counter-clockwise (reverse direction) by reason of the torque force exerted by the load. However, it cannot do so since output drum 26 is fixed against rotation via spring 32, and input drum 22 which is held against reverse rotation by the self-braking rotary power unit. To effect release of output drum 26 for reverse rotation under the urging of the load, release spring 50, which is in interference fit with control sleeve 34, is pulled by energization of solenoid 16 (FIG. 1) in a toward-the-right (clockwise) direction, as viewed in FIG. 2 and as indicated in FIG. 5, which pull tends to contract the coils of release spring 50 into a tighter grip on the control sleeve and thereby rotates the control sleeve. This clockwise rotative movement of control sleeve 34, while small, is of sufficient amount that, through tang 36, effects unwinding of the right-hand wound coils of spring 32 out of gripping relation with output drum 26, thereby allowing, under the urging of the load, output drum 26 to rotate in counter-clockwise (reverse direction) as viewed in FIGS. 2 and 5.

The actuator assembly 10 may, in addition to housing 20, include a timer assembly 62 secured to the interior of housing 20. The timer assembly 62 is employed where the output shaft 46 is required to rotate more than one revolution. The timer assembly 62 functions to restrict the running time of rotary power unit 12 and automatically shut off power to rotary power unit 12. Alternatively, the actuator assembly 10 may also include a cam 64 and a switch 66 when the output switch 46 is required to rotate less than one revolution. The cam 64 is a collar secured to output shaft 46 by a set screw to rotate with the latter while switch 66 is secured to housing 20 so as to ride on cam 64. The cam and switch coact to shut off power to rotary power unit 12 after a predetermined angular movement of output shaft 46.

The actuator assembly 10 may also include, where the components are electrical as shown, a terminal block 68 secured to frame 18 and a hole 70 in the housing through which electrical leads or conduits can extend.

Figure 4:
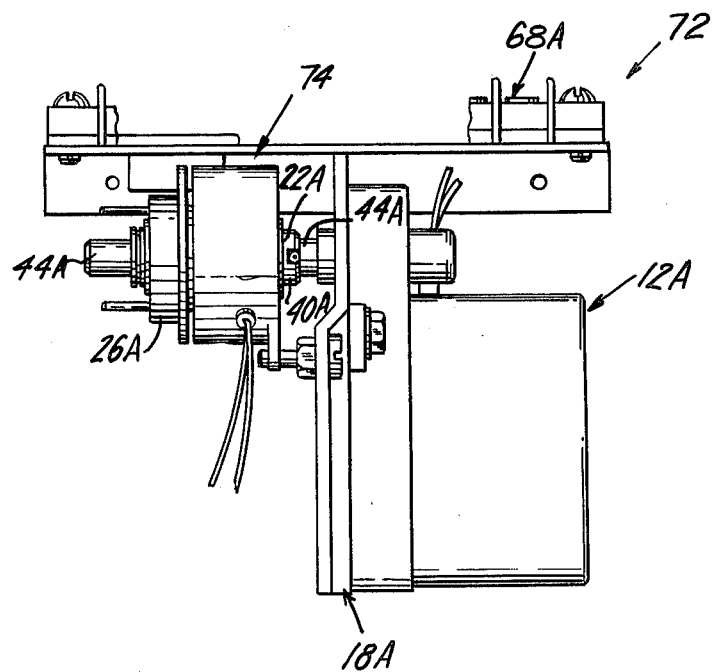
FIG. 4 is an elevational view of the invention according to a second embodiment.

In FIG. 4 is shown an actuator assembly 72, according to a second embodiment of this invention. The actuator assembly 72 differs from actuator assembly 10 in that an electro-magnetic spring clutch is substituted for spring clutch 14 and thereby obviates the need for a solenoid 16. In all other respects, the actuator assembly 72 is identical to actuator assembly 10 and therefore parts of assembly 72 corresponding to parts of assembly 10 will be designated by the same number with the suffix A added thereto.

The actuator assembly 72 has an electro-magnetic, normally disengaged, spring clutch 74 of the type such as fully disclosed in the U.S. patents to Sajovec, Jr., U.S. Pat. No. 3,185,276 dated May 25, 1965; Baer, U.S. Pat. No. 3,349,880 dated Oct. 31, 1967; and Mehrbrodt, U.S. Pat. No. 3,905,458, dated Sept. 16, 1975. In this type of spring clutch an armature, either integral with a control sleeve or engageable therewith, is axially movable upon energization of an electro-magnetic coil to hold the control sleeve to which the clutch sping is connected against rotation and hence effect engagement of the clutch. The functional coaction of spring clutch 74 with rotary power unit 12A and the load (including output driveshaft 46) is the same as described for actuator assembly 10 except that the electro-magnetic coil of the spring clutch 74 must remain energized to hold the load in a selected adjusted position. It, however, has the advantage that the spring clutch 74 will automatically disengage upon power failure, thus allowing the load to move to one of its extreme positions, such as a fully closed position.

It is believed now readily apparent that the present invention provides an actuator assembly employing a spring clutch which is relatively simple and inexpensive by reason of utilizing the self-braking rotary drive unit and thus eliminating the need for no-back brake element and means for releasing such element. It is an actuator assembly which is capable of accurate adjustment of the load, and in one embodiment, retention of such adjusted position without the need for consumption of energy. Further, it is a compact assembly capable of quick and easy field installation.

Although two embodiments of the invention have been illustrated and described in detail, it is to be expressly understood that the invention is not limited thereto. Various changes can be made in the arrangement of parts without departing from the spirit and scope of the invention as set forth in the appended claims and as the same will now be understood by those skilled in the art.

What is claimed is:
1. An actuator assembly for effecting movement of a load comprising, in combination,
   (a) a frame;
   (b) a self-braking rotary power unit mounted on said frame;
   (c) a spring clutch mounted on said frame and comprising:
      (c-1) an input drum connected to said rotary power unit to be driven by the latter;
      (c-2) an output drum coaxial with said input drum and connected to said load to effect movement of the latter;
      (c-3) a clutch spring normally engaging said input and output drums to transmit torque from the input drum to the output drum and hence movement of said load in one direction;
      (c-4) a sleeve surrounding said clutch spring and engaging a portion of the clutch spring;
   (d) a coil spring operative to effect rotation of said sleeve and disengagement of the clutch spring from the output drum and thereby allow the output drum to rotate under the force of said load urging rotation of the output drum in a direction opposite said one direction; and
   (e) electro-magnetic means connected to said coil spring so that upon energization thereof said coil spring is caused to grip the sleeve and rotate said sleeve and effect thereby said disengagement of the clutch spring.